United States Patent [19]

Huppenthal et al.

[11] Patent Number: 6,076,152

[45] Date of Patent: Jun. 13, 2000

[54] MULTIPROCESSOR COMPUTER ARCHITECTURE INCORPORATING A PLURALITY OF MEMORY ALGORITHM PROCESSORS IN THE MEMORY SUBSYSTEM

[75] Inventors: Jon M. Huppenthal; Paul A. Leskar, both of Colorado Springs, Colo.

[73] Assignee: SRC Computers, Inc., Colorado Springs, Colo.

[21] Appl. No.: 08/992,763

[22] Filed: Dec. 17, 1997

[51] Int. Cl.[7] ................................................ G06F 15/80
[52] U.S. Cl. .............................................................. 712/15
[58] Field of Search ................................ 712/13, 15, 2, 712/21, 22, 28; 708/232

[56] References Cited

U.S. PATENT DOCUMENTS

| 5,230,057 | 7/1993 | Shido et al. | 712/22 |
| 5,892,962 | 4/1999 | Cloutier | 712/16 |

OTHER PUBLICATIONS

Yun et al., A Distributed Memory MIMD Multi–Computer with Reconfigurable Custom Computing Capabilities IEEE, Dec. 13, 1997, pp. 8/13 especially pp. 9–11.

Gokhale, M., et al., "Processing in Memory: The Terasys Massively Parellel PIM Array"©Apr. 1995, IEEE, pp. 23–31.

DeHon, A., et al., "MATRIX A Reconfigurable Computing Device with Configurable Instruction Distribution", Hot Chips IX, Aug. 25–26, 1997, Stanford, California, MIT Artifical Intelligence Laboratory.

Buell, D., et al., "Splash 2: FPGAs in a Custom Computing Machine–Chapter 1–Custom Computing Machines: An Introduction", pp. 1–11, http://ww.computer.org/espress/catalog/bp07413/spls–ch1.html(originally believed published in J.of Supercomputing, voil. IX, 1995, pp. 219–230.

Agarwal, A, et al., "The Raw Compiler Project", pp. 1–12, http://cag–www.Ics.mit.edu/raw, Proceedings of the Second SUIF Compiler Workshop, Aug. 21–23,1997.

Hartenstein, R.W. et al. "A General Approach in System Design Intergrated Reconfigurable Accelerators", http://xputers.informatik.uni–kl.de/papers026–1.html, IEEE 1996 Conference, Austin, TX, Oct. 9–11, 1996.

Primary Examiner—John A. Follansbee
Attorney, Agent, or Firm—William J. Kubida, Esq.; Hogan & Hartgon

[57] ABSTRACT

A multiprocessor computer architecture incorporating a plurality of programmable hardware memory algorithm processors ("MAP") in the memory subsystem. The MAP may comprise one or more field programmable gate arrays ("FPGAs") which function to perform identified algorithms in conjunction with, and tightly coupled to, a microprocessor and each MAP is globally accessible by all of the system processors for the purpose of executing user definable algorithms. A circuit within the MAP signals when the last operand has completed its flow thereby allowing a given process to be interrupted and thereafter restarted. Through the use of read only memory ("ROM") located adjacent the FPGA, a user program may use a single command to select one of several possible pre-loaded algorithms thereby decreasing system reconfiguration time. A computer system memory structure MAP disclosed herein may function in normal or direct memory access ("DMA") modes of operation and, in the latter mode, one device may feed results directly to another thereby allowing pipelining or parallelizing execution of a user defined algorithm. The system of the present invention also provides a user programmable performance monitoring capability and utilizes parallelizer software to automatically detect parallel regions of user applications containing algorithms that can be executed in the programmable hardware.

22 Claims, 4 Drawing Sheets

MULTIPROCESSOR COMPUTER ARCHITECTURE INCORPORATING A PLURALITY OF MEMORY ALGORITHM PROCESSORS IN THE MEMORY SUBSYSTEM

BACKGROUND OF THE INVENTION

The present invention relates, in general, to the field of computer architectures incorporating multiple processing elements. More particularly, the present invention relates to a multiprocessor computer architecture incorporating a number of memory algorithm processors in the memory subsystem to significantly enhance overall system processing speed.

All general purpose computers are based on circuits that have some form of processing element. These may take the form of microprocessor chips or could be a collection of smaller chips coupled together to form a processor. In any case, these processors are designed to execute programs that are defined by a set of program steps. The fact that these steps, or commands, can be rearranged to create different end results using the same computer hardware is key to the computer's flexibility. Unfortunately, this flexibility dictates that the hardware then be designed to handle a variety of possible functions, which results in generally slower operation than would be the case were it able to be designed to handle only one particular function. On the other hand, a single function computer is inherently not a particularly versatile computer.

Recently, several groups have begun to experiment with creating a processor out of circuits that are electrically reconfigurable. This would allow the processor to execute a small set of functions more quickly and then be electrically reconfigured to execute a different small set. While this accelerates some program execution speeds, there are many functions that cannot be implemented well in this type of system due to the circuit densities that can be achieved in reconfigurable integrated circuits, such as 64-bit floating point math. In addition, all of these systems are presently intended to contain processors that operate alone. In high performance systems, this is not the case. Hundreds or even tens of thousands of processors are often used to solve a single problem in a timely manner. This introduces numerous issues that such reconfigurable computers cannot handle, such as sharing of a single copy of the operating system. In addition, a large system constructed from this type of custom hardware would naturally be very expensive to produce.

SUMMARY OF THE INVENTION

In response to these shortcomings, SRC Computers, Inc., Colorado Springs, Colo., assignee of the present invention, has developed a Memory Algorithm Processor ("MAP") multiprocessor computer architecture that utilizes very high performance microprocessors in conjunction with user reconfigurable hardware elements. These reconfigurable elements, referred to as MAPs, are globally accessible by all processors in the systems. In addition, the manufacturing cost and design time of a particular multiprocessor computer system is relatively low inasmuch as it can be built using industry standard, commodity integrated circuits and, in a preferred embodiment, each MAP may comprise a Field Programmable Gate Array ("FPGA") operating as a reconfigurable functional unit.

Particularly disclosed herein is the utilization of one or more FPGAs to perform user defined algorithms in conjunction with, and tightly coupled to, a microprocessor. More particularly, in a multiprocessor computer system, the FPGAs are globally accessible by all of the system processors for the purpose of executing user definable algorithms.

In a particular implementation of the present invention disclosed herein, a circuit is provided either within, or in conjunction with, the FPGAs which signals, by means of a control bit, when the last operand has completed its flow through the MAP, thereby allowing a given process to be interrupted and thereafter restarted. In a still more specific implementation, one or more read only memory ("ROM") integrated circuit chips may be coupled adjacent the FPGA to allow a user program to use a single command to select one of several possible algorithms pre-loaded in the ROM thereby decreasing system reconfiguration time.

Still further provided is a computer system memory structure which includes one or more FPGAs for the purpose of using normal memory access protocol to access it as well as being capable of direct memory access ("DMA") operation. In a multiprocessor computer system, FPGAs configured with DMA capability enable one device to feed results directly to another thereby allowing pipelining or parallelizing execution of a user defined algorithm located in the re-configurable hardware. The system and method of the present invention also provide a user programmable performance monitoring capability and utilizes parallelizer software to automatically detect parallel regions of user applications containing algorithms that can be executed in programmable hardware.

Broadly, what is disclosed herein is a computer including at least one data processor for operating on user data in accordance with program instructions. The computer includes at least one memory array presenting a data and address bus and comprises a memory algorithm processor associated with the memory array and coupled to the data and address buses. The memory algorithm processor is configurable to perform at least one identified algorithm on an operand received from a write operation to the memory array.

Also disclosed herein is a multiprocessor computer including a first plurality of data processors for operating on user data in accordance with program instructions and a second plurality of memory arrays, each presenting a data and address bus. The computer comprises a memory algorithm processor associated with at least one of the second plurality of memory arrays and coupled to the data and address bus thereof. The memory algorithm processor is configurable to perform at least one identified algorithm on an operand received from a write operation to th e associated one of the second plurality of memory arrays.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
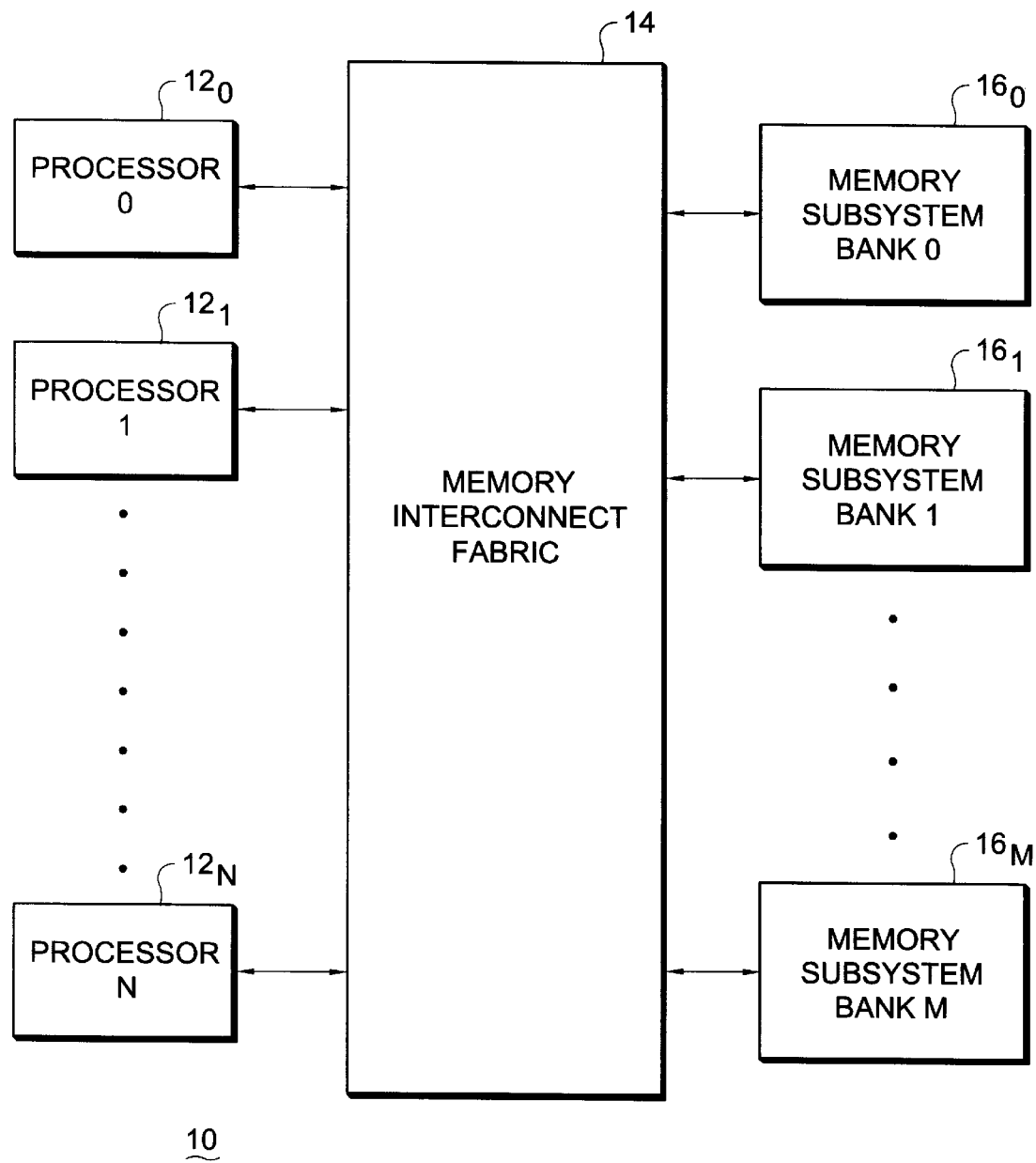
FIG. 1 is a simplified, high level, functional block diagram of a standard multiprocessor computer architecture.

With reference now to FIG. 1, a conventional multiprocessor computer 10 architecture is shown. The multiprocessor computer 10 incorporates N processors $12_O$ through $12_N$ which are bi-directionally coupled to a memory interconnect fabric 14. The memory interconnect fabric 14 is then also coupled to M memory banks comprising memory bank subsystems $16_0$ (Bank 0) through $16_M$ (Bank M).

Figure 2:
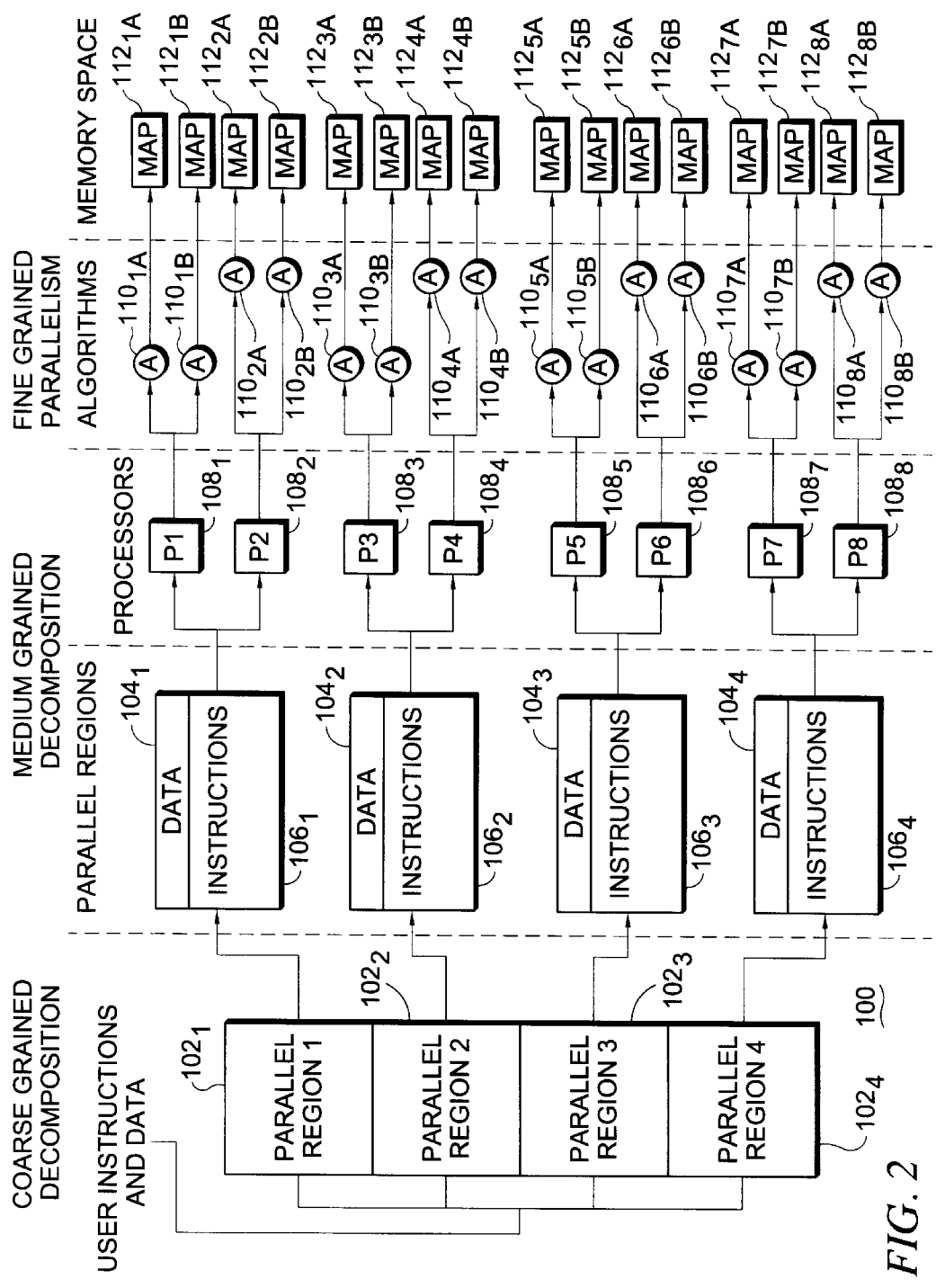
FIG. 2 is a simplified logical block diagram of a possible computer application program decomposition sequence for use in conjunction with a multiprocessor computer architecture utilizing a number of memory algorithm processors ("MAPs") in accordance with the present invention.

With reference now to FIG. 2, a representative application program decomposition for a multiprocessor computer architecture 100 incorporating a plurality of memory algorithm processors in accordance with the present invention is shown. The computer architecture 100 is operative in response to user instructions and data which, in a coarse grained portion of the decomposition, are selectively directed to one of (for purposes of example only) four parallel regions $102_1$ through $102_4$ inclusive. The instructions and data output from each of the parallel regions $102_1$ through $102_4$ are respectively input to parallel regions segregated into data areas $104_1$ through $104_4$ and instruction areas $106_1$ through $106_4$. Data maintained in the data areas $104_1$ through $104_4$ and instructions maintained in the instruction areas $106_1$ through $106_4$ are then supplied to, for example, corresponding pairs of processors $108_1$, $108_2$ (P1 and P2); $108_3$, $108_4$ (P3 and P4); $108_5$, $108_6$ (P5 and P6) ; and $108_7$, $108_8$ (P7 and P8) as shown. At this point, the medium grained decomposition of the instructions and data has been accomplished.

A fine grained decomposition, or parallelism, is effectuated by a further algorithmic decomposition wherein the output of each of the processors $108_1$ through $108_8$ is broken up, for example, into a number of fundamental algorithms $110_{1A}$, $110_{1B}$, $110_{2A}$, $110_{2B}$ through $110_{8B}$ as shown. Each of the algorithms is then supplied to a corresponding one of the MAPs $112_{1A}$, $112_{1B}$, $112_{2A}$, $112_{2B}$ through $112_{8B}$ in the memory space of the computer architecture 100 for execution therein as will be more fully described hereinafter.

Figure 3:
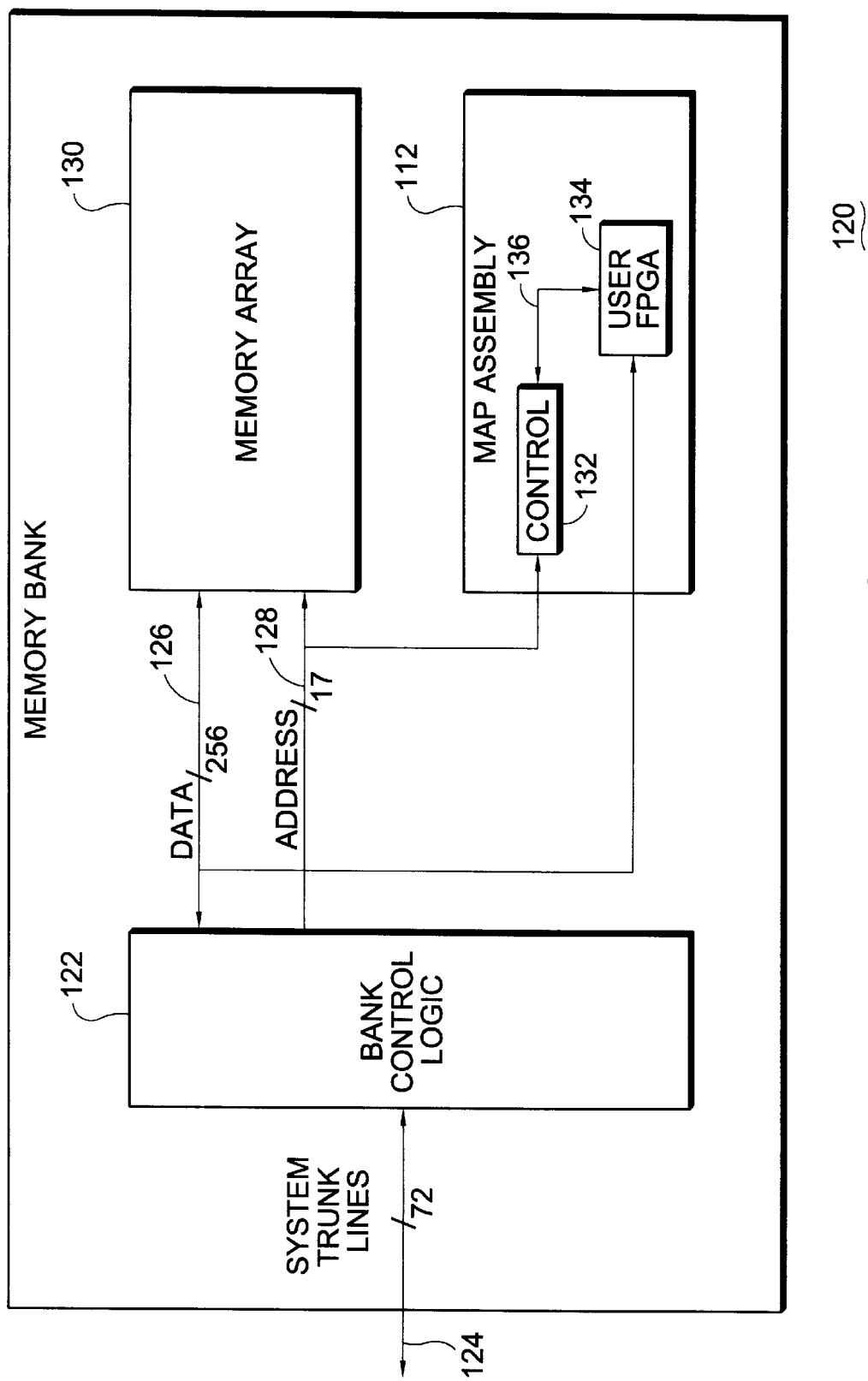
FIG. 3 is a more detailed functional block diagram of an individual one of the MAPs of the preceding figure and illustrating the bank control logic, memory array and MAP assembly thereof.

With reference additionally now to FIG. 3, a preferred implementation of a memory bank 120 in a MAP system computer architecture 100 of the present invention is shown for a representative one of the MAPs 112 illustrated in the preceding figure. Each memory bank 120 includes a bank control logic block 122 bi-directionally coupled to the computer system trunk lines, for example, a 72 line bus 124. The bank control logic block 122 is coupled to a bi-directional data bus 126 (for example 256 lines) and supplies addresses on an address bus 128 (for example 17 lines) for accessing data at specified locations within a memory array 130.

The data bus 126 and address bus 128 are also coupled to a MAP assembly 112. The MAP assembly 112 comprises a control block 132 coupled to the address bus 128. The control block 132 is also bi-directionally coupled to a user field programmable gate array ("FPGA") 134 by means of a number of signal lines 136. The user FPGA 134 is coupled directly to the data bus 126. In a particular embodiment, the FPGA 134 may be provided as a Lucent Technologies OR3T80 device.

The computer architecture 100 comprises a multiprocessor system employing uniform memory access across common shared memory with one or more MAPs 112 located in the memory subsystem, or memory space. As previously described, each MAP 112 contains at least one relatively large FPGA 134 that is used as a reconfigurable functional unit. In addition, a control block 132 and a preprogrammed or dynamically programmable configuration read-only memory ("ROM" as will be more fully described hereinafter) contains the information needed by the reconfigurable MAP assembly 112 to enable it to perform a specific algorithm. It is also possible for the user to directly download a new configuration into the FPGA 134 under program control, although in some instances this may consume a number of memory accesses and might result in an overall decrease in system performance if the algorithm was short-lived.

FPGAs have particular advantages in the application shown for several reasons. First, commercially available, off-the-shelf FPGAs now contain sufficient internal logic cells to perform meaningful computational functions. Secondly, they can operate at speeds comparable to microprocessors, which eliminates the need for speed matching buffers. Still further, the internal programmable routing resources of FPGAs are now extensive enough that meaningful algorithms can now be programmed without the need to reassign the locations of the input/output ("I/O") pins.

By placing the MAP 112 in the memory subsystem or memory space, it can be readily accessed through the use of memory read and write commands, which allows the use of a variety of standard operating systems. In contrast, other conventional implementations propose placement of any reconfigurable logic in or near the processor. This is much less effective in a multiprocessor environment because only one processor has rapid access to it. Consequently, reconfigurable logic must be placed by every processor in a multiprocessor system, which increases the overall system cost. In addition, MAP 112 can access the memory array 130 itself, referred to as Direct Memory Access ("DMA"), allowing it to execute tasks independently and asynchronously of the processor. In comparison, were it were placed near the processor, it would have to compete with the processors for system routing resources in order to access memory, which deleteriously impacts processor performance. Because MAP 112 has DMA capability, (allowing it to write to memory), and because it receives its operands via writes to memory, it is possible to allow a MAP 112 to feed results to another MAP 112. This is a very powerful feature that allows for very extensive pipelining and parallelizing of large tasks, which permits them to complete faster.

Many of the algorithms that may be implemented will receive an operand and require many clock cycles to produce a result. One such example may be a multiplication that takes 64 clock cycles. This same multiplication may also need to be performed on thousands of operands. In this situation, the incoming operands would be presented sequentially so that while the first operand requires 64 clock cycles to produce results at the output, the second operand, arriving one clock cycle later at the input, will show results one clock cycle later at the output. Thus, after an initial delay of 64 clock cycles, new output data will appear on every consecutive clock cycle until the results of the last operand appears. This is called "pipelining".

In a multiprocessor system, it is quite common for the operating system to stop a processor in the middle of a task, reassign it to a higher priority task, and then return it, or another, to complete the initial task. When this is combined with a pipelined algorithm, a problem arises (if the processor stops issuing operands in the middle of a list and stops accepting results) with respect to operands already issued but not yet through the pipeline. To handle this issue, a solution involving the combination of software and hardware is disclosed herein.

To make use of any type of conventional reconfigurable hardware, the programmer could embed the necessary commands in his application program code. The drawback to this approach is that a program would then have to be tailored to be specific to the MAP hardware. The system of the present invention eliminates this problem. Multiprocessor computers often use software called parallelizers. The purpose of this software is to analyze the user's application code and determine how best to split it up among the processors. The present invention provides significant advantages over a conventional parallelizer and enables it to recognize portions of the user code that represent algorithms that exist in MAPs 112 for that system and to then treat the MAP 112 as another computing element. The parallelizer then automatically generates the necessary code to utilize the MAP 112. This allows the user to write the algorithm directly in his code, allowing it to be more portable and reducing the knowledge of the system hardware that he has to have to utilize the MAP 112.

Figure 4:
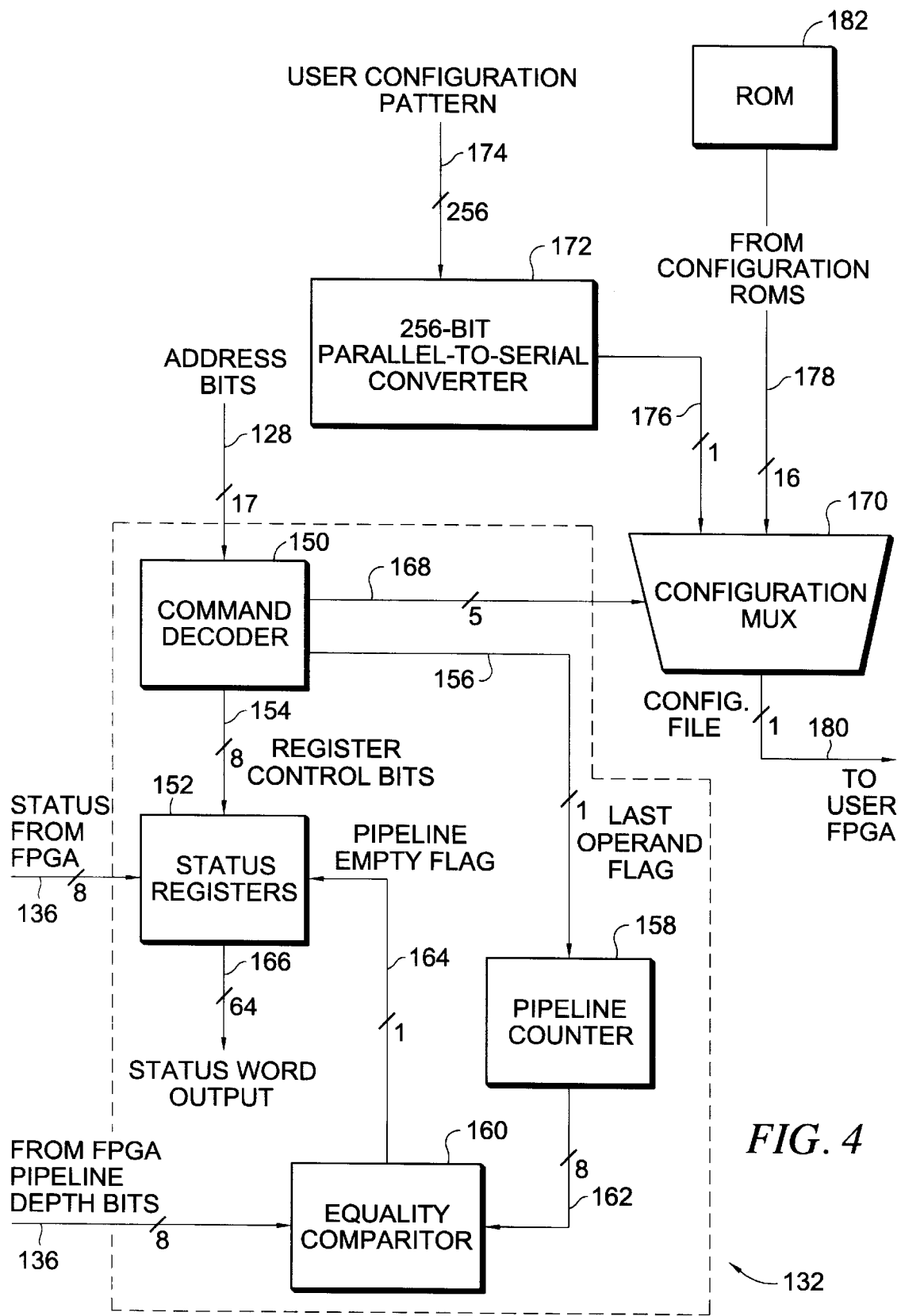
FIG. 4 is a more detailed functional block diagram of the control block of the MAP assembly of the preceding illustration illustrating its interconnection to the user FPGA thereof.

With reference additionally now to FIG. 4, a block diagram of the MAP control block 132 is shown in greater detail. The control block 132 is coupled to receive a number of command bits (for example, 17) from the address bus 128 at a command decoder 150. The command decoder 150 then supplies a number of register control bits to a group of status registers 152 on an eight bit bus 154. The command decoder 150 also supplies a single bit last operand flag on line 156 to a pipeline counter 158. The pipeline counter 158 supplies an eight bit output to an equality comparitor 160 on bus 162. The equality comparitor 160 also receives an eight bit signal from the FPGA 134 on bus 136 indicative of the pipeline depth. When the equality comparitor determines that the pipeline is empty, it provides a single bit pipeline empty flag on line 164 for input to the status registers 152. The status registers are also coupled to receive an eight bit status signal from the FPGA 134 on bus 136 and it produces a sixty four bit status word output on bus 166 in response to the signals on bus 136, 154 and line 164.

The command decoder 150 also supplies a five bit control signal to a configuration multiplexer ("MUX") 170 as shown. The configuration mux 170 receives a single bit output of a 256 bit parallel-serial converter 172 on line 176. The inputs of the 256 bit parallel-to-serial converter 172 are coupled to a 256 bit user configuration pattern bus 174. The configuration mux 170 also receives sixteen single bit inputs from the configuration ROMs (illustrated as ROM 182) on bus 178 and provides a single bit configuration file signal on line 180 to the user FPGA 134 as selected by the control signals from the command decoder 150 on the bus 168.

In operation, when a processor 108 is halted by the operating system, the operating system will issue a last operand command to the MAP 112 through the use of command bits embedded in the address field on bus 128. This command is recognized by the command decoder 150 of the control block 132 and it initiates a hardware pipeline counter 158. When the algorithm was initially loaded into the FPGA 134, several output bits connected to the control block 132 were configured to display a binary representation of the number of clock cycles required to get through its pipeline (i.e. pipeline "depth")on bus 136 input to the equality comparitor 160. After receiving the last operand command, the pipeline counter 158 in the control block 132 counts clock cycles until its count equals the pipeline depth for that particular algorithm. At that point, the equality comparitor 160 in the control block 132 de-asserts a busy bit on line 164 in an internal group of status registers 152. After issuing the last operand signal, the processor 108 will repeatedly read the status registers 152 and accept any output data on bus 166. When the busy flag is de-asserted, the task can be stopped and the MAP 112 utilized for a different task. It should be noted that it is also possible to leave the MAP 112 configured, transfer the program to a different processor 108 and restart the task where it left off In order to evaluate the effectiveness of the use of the MAP 112 in a given application, some form of feedback to the use is required. Therefore, the MAP 112 may be equipped with internal registers in the control block 132 that allow it to monitor efficiency related factors such as the number of input operands versus output data, the number of idle cycles over time and the number of system monitor interrupts received over time. One of the advantages that the MAP 112 has is that because of its reconfigurable nature, the actual function and type of function that are monitored can also change as the algorithm changes. This provides the user with an almost infinite number of possible monitored factors without having to monitor all factors all of the time.

While there have been described above the principles of the present invention in conjunction with a specific multiprocessor architecture it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. In a computer system having at least one data processor for executing an application program by operating on user data in accordance with application program instructions, said computer system having at least one memory bank with a data bus and an address bus connected to said at least one data processor, the improvement comprising:

a plurality of memory algorithm processors within individually addressable portions of said memory bank;

means connecting said plurality of memory algorithm processors to said data bus and to said address bus such that said plurality of memory algorithm processors are individually memory addressable by said at least one data processor as said at least one data processor executes said application program; and said plurality of memory algorithm processors being configured as individual data processing machines that can be memory addressed to perform data processing related to said application program in accordance with an identified algorithm, said data processing being performed on at least one operand that is received as a result of a write operation to said memory bank by said at least one data processor.

2. The improvement of claim 1 wherein each of said plurality of memory algorithm processors comprises a field programmable gate array.

3. The improvement of claim 1 wherein each of said plurality of memory algorithm processors is operative to memory address said memory bank independent of said at least one data processor.

4. The improvement of claim 1 wherein an identified algorithm is preprogrammed into each of said plurality of memory algorithm processors.

5. The improvement of claim 4 wherein a plurality of identified algorithms are preprogrammed into a memory device that is associated with said plurality of memory algorithm processors.

6. The improvement of claim 5 wherein said memory device comprises at least one read only memory device.

7. The improvement of claim 1 wherein any given one of said plurality of memory algorithm processors is operative to pass a data processing result of an operand that has been processed by an identified algorithm to another of said plurality of memory algorithm processors.

8. The improvement of claim 1 wherein said plurality of memory algorithm processors comprise a memory algorithm processor assembly, said memory algorithm processor assembly including:

a control block having a command decoder coupled to said address bus and having a pipeline counter coupled to said command decoder;

said command decoder for providing a last operand flag to said pipeline counter in response to a last operand command from an operating system of said at least one data processor.

9. The improvement of claim 8 wherein said control block further includes:

at least one status register; and an equality comparator coupled to receive a pipeline depth signal and an output of said pipeline counter, said equality comparator for providing a pipeline empty flag to said at least one status register.

10. The improvement of claim 9 wherein said at least one status register is coupled to said command decoder to receive a register control signal and is coupled to said plurality of memory algorithm processors to receive a status signal, said at least one status register providing a status word output signal.

11. A multiprocessor computer system comprising:

a plurality of data processors for executing at least one application program by operating on user data in accordance with program instructions;

a memory bank having a data bus and an address bus connected to said plurality of data processors;

a plurality of memory algorithm processors within said memory bank at a plurality of individual memory addressable memory locations;

means coupling said plurality of individual memory algorithm processors to said data bus and to said address bus;

said plurality of individual memory algorithm processors being individually memory addressable by all of said plurality of data processors; and said plurality of memory algorithm processors being individually configurable to perform an identified algorithm on an operand that is received from a write operation by said at least one data processor to said memory bank as said at least one data processor executes said at least one application program.

12. The multiprocessor computer system of claim 11 wherein all of said plurality of memory algorithm processors are memory addressable by all of said plurality of data processors.

13. The multiprocessor computer system of claim 12 wherein all of said plurality of memory algorithm processors are mutually memory addressable.

14. The multiprocessor computer system of claim 13 wherein said plurality of memory algorithm processors collectively comprises a memory algorithm processor assembly, said memory algorithm processor assembly including:

a control block operative to provide a last operand flag in response to a last operand having been processed by said memory algorithm processor assembly.

15. The multiprocessor computer system of claim 11 including:

at least one memory device associated with said plurality of memory algorithm processors for storing a plurality of pre loaded identified algorithms.

16. The multiprocessor computer system of claim 15 wherein said at least one memory device is responsive to a predetermined command from a data processor and operates in response thereto to selected one of said plurality of pre-loaded identified algorithms to be implemented by an addressed one of said plurality of memory algorithm processors.

17. The multiprocessor computer system of claim 16 wherein said at least one memory device comprises at least one read only memory device.

18. The multiprocessor computer system of claim 11 wherein each of said plurality of memory algorithm processors comprises a field programmable gate array.

19. The multiprocessor computer system of claim 11 wherein each of said plurality of memory algorithm processors is memory accessible through normal memory access protocol.

20. The multiprocessor computer system of claim 11 wherein each of said plurality of memory algorithm processors has direct memory access capability to said memory bank.

21. The multiprocessor computer system of claim 11 wherein each of said plurality of memory algorithm processors is operative to pass a result of a processed operand to another memory algorithm processor.

22. The multiprocessor computer system of claim 11 operative to detect at least one parallel region of said at least one application program, wherein at least one of said plurality of memory algorithm processors is configured as a function of said detected at least one parallel region of said at least one application program.

* * * * *